3,437,552
GLASS LAMINATE AND INTERLAYER
Griffith Bowen, Wilmington, Del., assignor to E. I. du Pont de Nemours and Company, Wilmington, Del., a corporation of Delaware
No Drawing. Filed Aug. 1, 1967, Ser. No. 657,486
Int. Cl. B32b 17/10
U.S. Cl. 161—165                                     11 Claims

ABSTRACT OF THE DISCLOSURE

A pair of outer glass sheets laminated to each side of a composite interlayer comprising a rigid polyvinyl butyral core of hydroxyl content about 22 to 32 percent having on each side an adhesive layer of plasticized polyvinyl butyral resin the hydroxyl content of which is low enough to inhibit substantial migration of the plasticizer into the rigid sheet at equilibrium.

BACKGROUND OF THE INVENTION

This invention relates to glass laminates and, more particularly, to composite interlayers for such laminates which contribute load-bearing strength as well as impact resistance.

Although conventional safety glass, either laminated or tempered, has been in use for many years, its use as a structural member is limited because of its complete failure, for example, under impact. The fractured glazing retains little or none of its original rigidity or load-bearing ability; tempered glass breaks into many pieces and usually disintegrates, and laminated glass fails to a relatively limp web.

SUMMARY OF THE INVENTION

In a laminated article comprising a pair of outer glass sheets secured to a composite interlayer of a resinous sheet having an adhesive layer on each side thereof; the improvement wherein said resinous sheet is a rigid sheet of polyvinyl butyral resin having a hydroxyl content of about 22 to 32 percent, and wherein said adhesive layer is a 0.005- to 0.03-inch layer of a polyvinyl butyral resin containing about 10 to 50 parts, per 100 parts fo resin, of a plasticizer therefor, the hydroxyl content of said adhesive layers being sufficiently lower than the hydroxyl content of said rigid sheet to inhibit substantial migration of plasticizer into said rigid sheet at equilibrium.

DETAILED DESCRIPTION OF THE INVENTION

The rigid core sheet of polyvinyl butyral (PVB) resin can be prepared by methods known to those skilled in the art. The hydroxyl content is between about 22 and 32 percent. The preparation of such resins is known in the art, e.g., Stamatoff, U.S. Patent 2,400,957, and the meaning and determination of "hydroxyl content" is known and described in detail, e.g., in Burk et al., U.S. Patent 2,526,728. By the term "rigid" it is meant that the PVB resin be of substantial molecular weight and substantially free from plasticizer at equilibrium The molecular weight of the PVB is a function of the molecular weight of the polyvinyl alcohol used to prepare it; a molecular weight range of the polyvinyl alcohol of about 20,000 to 100,000 is representative. In general, the rigid layer will be from about 0.06 to 0.15 inch in thickness.

The adhesive layers employed in this invention are also PVB resins; however, the hydroxyl content should be low enough to inhibit any substantial plasticizer migration from the adhesive layers into the core at equilibrium. Generally, the hydroxyl content of the adhesive layers will be about 8 to 15 percentage points lower than the hydroxyl content of the core resin. Typically, the hydroxyl content of the adhesive layers will range from about 7 to 24 percent, preferably about 12 to 22 percent. The adhesive layers may be from about 0.005 to 0.03 inch in thickness but are preferably about 0.01 to 0.02 inch in thickness.

The adhesive layers will contain about 10 to 60 parts of a plasticizer for the PVB resin per hundred parts thereof. Preferably about 30 to 45 parts of plasticizer will be used. Suitable plasticizers for the PVB resins of this invention are discussed in the Burk et al. patent. Monocarboxylic aliphatic acid esters of ether glycols, e.g., triethylene glycol di-2-ethylbutyrate, are particularly useful. Many other compatible plasticizers known to those skilled in the art are useful.

The hydroxyl content of the PVB resin will have a pronounced effect upon its affinity for plasticizers; the lower the hydroxyl content, the greater the ability of the resin to retain plasticizer. Because of this tendency, the interlayer system of this invention can be designed to inhibit undesired plasticizer migration into the rigid core by maintaining a difference in hydroxyl content between the adhesive layers and the core. Moreover, a minor amount of plasticizer, e.g., 10 parts, can be incorporated into the PVB resin to be used for the core material to enhance its processability and, with proper selection of the difference in hydroxyl content and amount of plasticizer employed in the adhesive layer, the minor amount of plasticizer in the core will migrate into the adhesive layers. Accordingly, the core will be substantially free of plasticizer at equilibrium.

The glass used to form the outer layers of the laminate is at least about 0.04-inch thick but not usually greater than about 0.15-inch thick. Preferably, it ranges from about 0.05 to 0.09 inch in thickness. The glass may be annealed glass, thermally tempered or pre-stressed glass, or particularly chemically tempered glass such as "Chemcor" produced by Corning Glass Co.

The articles prepared in accordance with this invention display an exceptional combination of properties, e.g., laminar strength, support strength, and impact resistance. The clarity of the articles is surprisingly good considering the thickness and complexity of the structure. The use of many other rigid resin layers with the above adhesive as well as the use of many other adhesive layers with the above-described rigid layers has proven to be unsatisfactory. Thus, the combination of this invention is seen to yield unexpected results.

This invention describes a multilayer, rigid (flexural modulus greater than 50,000 p.s.i. at the use temperature) polymeric sheet which can be used as a composite interlayer in laminated glass to provide a transparent structure which retains its integrity and still functions as a load-bearing structural member when the glass layers are broken. The surface durability of glass is combined in a tough construction that does not fail in a catastrophic way. The composite interlayer contains at least three plies—a central rigid core and two relatively soft exterior adhesive layers. The soft adhesive layers serve as accommodation layers to relieve stresses due to differential thermal expansion and adhere sufficiently to glass and the core material so that the components do not separate except locally when the laminate is impacted in tests simulating severe use conditions. In addition, when the glass layers are fractured, the core is tough enough so that the cracks do not propagate through the interlayer but the interlayer remains intact.

A typical use test might be the automotive glazing Society of Automotive Engineers (SAE) test in which a five-pound steel ball is dropped from 12 feet on a horizontal 12-inch x 12-inch test specimen. Laminated glass containing some of the interlayers described in this invention survive this test from 0° F. to 120° F. without splitting (the glass fractures). Except for spalling locally in the area of impact, nearly all of the fractured glass is retained and the laminate retains a good proportion of its integrity and load-bearing capability. For other uses, for example, an unframed door, the impact tests would be less severe and more of the construction would survive them.

Laminated constructions containing the interlayers described can be used as structural members where obstructions to vision such as post or their supports are undesirable. Architectural glazing can function as a wall or roof without visual obstruction due to posts. Transparent doors can be fabricated which still function as a closure if the glass were broken by impact and, also, the hazard of large falling fragments would be eliminated.

The invention will now be described in connection with examples of specific embodiments thereof wherein parts and percentages are by weight unless otherwise specified.

EXAMPLE 1

A rigid core sheet is prepared from a PVB resin made by an acid-catalyzed condensation of polyvinyl alcohol and butyraldehyde wherein the ratio of reactants is adjusted to give a hydroxyl content (weight percent of unacetalized vinyl alcohol monomer units in the chain) of 31.6 by compression molding 12-inch x 12-inch x 0.10-inch plaques in a steam-heated (175° C.) press.

Sheeting for two 0.015-inch adhesive layers is prepared by plasticizing a PVB resin of about 23 percent hydroxyl content with 45 parts, per 100 parts of resin, of triethylene glycol di-2-ethylbutyrate by adding the plasticizer to an agitated aqueous slurry, filtering and extruding the moist cake in an extractor-extruder.

The adhesive layers and core plaques are conditioned to about 23 percent relative humidity and assembled with an adhesive layer on each side of the core plaque. This composite interlayer is then assembled between two outer sheets of annealed plate glass, 0.125-inch thick and compressed between cushions in the same steam press at contact pressure. The glass laminate is then heated at 135° C. and 225 p.s.i. for 9 minutes in an oil autoclave.

The toughness of the laminate can be determined by dropping a 5-pound steel ball (FPB test) from various test heights onto laminates supported in a horizontal frame and equilibrated to 0° F., 73° F., or 120° F. At 73° F. and 120° F., the glass cracks but the laminate remains rigid and the ball is supported in drop tests from 18 feet. At 0° F., the laminate splits but the ball does not penetrate in tests from 4 feet.

EXAMPLE 2

The above example is repeated except that the adhesive layers are 0.030-inch thick and the interlayer and glass assembly is placed in an oil-resistant plastic bag which is evacuated to less than 100 mm., and then the bagged assembly is autoclaved at 135° C. and 225 p.s.i. for 9 minutes.

In FPB test from 12 feet at 140° F. and 73° F., the glass cracks but the ball does not penetrate and the laminate does not split but remains rigid. In FPB test from 6 feet at 0° F., the glass cracks and the laminate remains rigid and does not split; in tests from 8 feet, the laminate splits although the ball does not penetrate.

EXAMPLE 3

A core sheet is prepared as in Example 1 except that the 31.6 OH resin is plasticized with 4 parts, per 100 parts of resin, triethylene glycol di-2-ethylbutyrate by adding the plasticizer to an agitated aqueous slurry, filtering, drying the flake and molding as before.

Sheeting for two 0.016-inch thick adhesive layers is prepared by plasticizing 100 parts of a PVB resin of about 23 percent hydroxyl content with 45 parts of triethylene glycol di-2-ethylbutyrate and incorporating 2.7 meq./kg. resin of monopotassium tris (hydroxymethyl) amino methane phthalate as an adhesion control agent during extrusion.

Laminates are prepared and tested as described in Example 1. In FPB tests at 120° F., 73° F., and 0° F., from drop heights of 12 feet, 12 feet, and 6 feet, respectively, the glass cracks, but the laminate remains and does not split.

EXAMPLE 4

Core plaques and adhesive layers are prepared as in Example 3 except that the adhesive layers contain 2.3 meq./kg. resin of dipotassium phthalate as an adhesion controlling agent and are 0.030-inch thick.

Laminates prepared as in Example 1, when tested for toughness in the FPB test, survive drops from 12 feet at 0° F., 73° F., and 120° F. The glass will crack somewhat but the laminate will remain rigid and the ball will be supported.

The example can be repeated except that the glass is a chemically tempered glass ("Chemcor," available from Corning Glass Company) of 0.08-inch thickness. Repeating the FPB test at 0° F. typically shows similar results with somewhat less glass spalled off the bottom of the laminate.

The laminated structures described remain usably stiff even after prolonged storage at 120° F. Even after 48 days at 120° F., the flexural modulus typically remains at least about 90,000 p.s.i., thus illustrating no substantially detrimental plasticizer migration into the core sheet.

EXAMPLE 5

A rigid core sheet is prepared by compression molding a PVB resin of about a 23 percent hydroxyl content into plaques 12 inches x 12 inches x 0.075 inch.

Adhesive films, 12 inches x 12 inches x 0.010 inch, are prepared by compression molding a PVB resin of 12.6 percent hydroxyl content plasticized as before with about 20 parts of triethylene glycol di-2-ethyl butyrate per 100 parts of resin.

Laminates, prepared as described in Example 1 but with chemically tempered glass, when impacted in FPB tests at 120° F. from 11 feet do not split but remain rigid, although the glass cracks. When impacted at 70° F. from 14 feet, two out of five did not split but remained rigid although the glass cracked.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

I claim:
1. In a laminated article comprising a pair of outer glass sheets secured to a composite interlayer of a resinous sheet having an adhesive layer on each side thereof; the improvement wherein said resinous sheet is a rigid sheet of polyvinyl butyral resin substantially free of plasticizer and having a hydroxyl content of about 22 to 32 percent, and wherein said adhesive layer is a 0.005– to 0.03-inch layer of a polyvinyl butyral resin containing about 10 to 50 parts, per 100 parts of resin, of a plasticizer therefor, the hydroxyl content of said adhesive layers being sufficiently lower than the hydroxyl content of said rigid sheet to inhibit substantial migration of plasticizer into said rigid sheet at equilibrium.

2. A laminated article as defined in claim 1 wherein said adhesive layer has a hydroxyl content of from about 7 to 24 percent, being about 8 to 15 percentage points lower than the hydroxyl content of said rigid layer.

3. A laminated article as defined in claim 2 wherein said hydroxyl content of said adhesive layer is from about 12 to 22 percent.

4. A laminated article as defined in claim 2 wherein said rigid sheet is about 0.06 to 0.15 inch in thickness, said adhesive layers are about 0.01 to 0.02 inch in thickness, and said glass sheets are about 0.04 to 0.15 inch in thickness.

5. A laminated article as defined in claim 3 wherein said adhesive layer contains about 30 to 45 parts of plasticizer.

6. A laminated article as defined in claim 2 wherein said glass sheets are about 0.05 to 0.09 inch in thickness.

7. A composite interlayer, suitable for lamination between a pair of glass sheets, of a rigid sheet of polyvinyl butyral resin substantially free of plasticizer and having a hydroxyl content of about 22 to 32 percent, having on each side thereof an adhesive layer, about 0.005 to 0.03 inch in thickness, of a polyvinyl butyral resin containing about 10 to 50 parts, per 100 parts of resin, of a plasticizer therefor, the hydroxyl content of said adhesive layers being sufficiently lower than the hydroxyl content of said rigid sheet to inhibit substantial migration of plasticizer into said rigid sheet at equilibrium.

8. A composite interlayer as defined in claim 7 wherein said adhesive layer has a hydroxyl content of from about 7 to 24 percent, being about 8 to 15 percentage points lower than the hydroxyl content of said rigid layer.

9. A composite interlayer as defined in claim 8 wherein said hydroxyl content of said adhesive layer is from about 12 to 22 percent.

10. A composite interlayer as defined in claim 8 wherein said rigid sheet is about 0.06 to 0.15 inch in thickness, said adhesive layers are about 0.01 to 0.02 inch in thickness, and said glass sheets are about 0.04 to 0.15 inch in thickness.

11. A composite layer as defined in claim 9 wherein said adhesive layer contains about 30 to 45 parts of plasticizer.

References Cited

UNITED STATES PATENTS 2,526,728 10/1950 Burk et al. _____ 161—199
3,178,334 4/1965 Bragaw et al. _____ 161—199

ROBERT F. BURNETT, *Primary Examiner.*

WILLIAM J. VAN BALEN, *Assistant Examiner.*

U.S. Cl. X.R.

161—199; 260—73; 156—106